Aug. 29, 1950          E. E. HUPP          2,520,721

CLUTCH CONTROL MECHANISM

Filed Oct. 31, 1945          3 Sheets-Sheet 1

INVENTOR.
EDWARD E. HUPP
BY
H. O. Clayton
ATTORNEY

Aug. 29, 1950  E. E. HUPP  2,520,721
CLUTCH CONTROL MECHANISM
Filed Oct. 31, 1945  3 Sheets—Sheet 2

INVENTOR.
EDWARD E. HUPP
BY
J. O. Clayton
ATTORNEY

Aug. 29, 1950     E. E. HUPP     2,520,721
CLUTCH CONTROL MECHANISM

Filed Oct. 31, 1945     3 Sheets-Sheet 3

INVENTOR.
EDWARD E. HUPP
BY
*H.V. Clayton*
ATTORNEY

Patented Aug. 29, 1950

2,520,721

UNITED STATES PATENT OFFICE 2,520,721

CLUTCH CONTROL MECHANISM

Edward E. Hupp, South Bend, Ind., assignor to Bendix Aviation Corporation, South Bend, Ind., a corporation of Delaware Application October 31, 1945, Serial No. 625,740

6 Claims. (Cl. 192—91)

This invention relates in general to clutch mechanism of an automotive vehicle and in particular to power means for controlling the operation thereof.

More specifically, the invention relates to a pressure differential operated power means for controlling the operation of a combined centrifugal and spring operated clutch. To this end there is provided a manifold vacuum operated motor operably connected to the spring operated pressure plate of the clutch, said plate having mounted thereon centrifugally operated means supplemented by the operation of the clutch springs in effecting the desired engagement of the clutch.

A further feature of the invention relates to the provision of power means for controlling the operation of the aforementioned combined centrifugal and spring operated clutch, said means being controlled in part by a vehicle speed responsive governor, in part by an operation of the throttle valve of the engine, and in part by the clutch pedal of the vehicle.

Yet another object of my invention is to provide power means, including a pressure differential operated motor, for operating the clutch springs of a combined spring and centrifugal operated friction clutch, said power means functioning to compress said springs, to render the same inoperable as a clutch engaging means, when either the speed of the vehicle is either equal to or below a certain factor or the clutch pedal is depressed, said power means further functioning to permit said clutch springs to expand, to effect their clutch engaging operation, when the speed of the car exceeds the aforementioned factor and the clutch pedal is released or when the speed of the car is below said factor and the gaseous pressure of the intake manifold exceeds the gaseous pressure within the aforementioned motor.

A further object of my invention is to provide, in the power plant of an automotive vehicle, a pressure differential operated motor which is energized, when the vehicle is travelling at or below a certain speed, to compress the springs of a combined centrifugal and spring operated friction clutch to thereby render said springs inoperative to engage the clutch; and said motor is deenergized, when the vehicle is travelling above the aforementioned speed, to permit said springs to expand to thereby supplement the centrifugal means in the operation of engaging the clutch.

It follows therefore than an object of my invention is to provide, in the power plant of an automotive vehicle, power means operable to effect a firm clutch engaging operation of a combined centrifugal and spring operated friction clutch when the vehicle is travelling above a certain speed.

Yet another object of my invention is to provide power means for controlling the springs of a combined spring and centrifugally operated friction clutch whereby the centrifugally operated means of said clutch is supplemented by the springs, to insure a firm engagement of the clutch, when the car is traveling above a certain critical speed and whereby said centrifugally operated means is supplemented by said springs to engage the clutch when the vehicle is travelling below the aforementioned critical speed provided the gaseous pressure within the intake manifold is substantially lowered during the engagement of the clutch.

Briefly stated, the principal object of my invention is to provide a pressure differential operated motor for operating the clutch springs of a combined spring and centrifugally operated friction clutch of an automotive vehicle the parts of the mechanism being so constructed and arranged and so operative that the clutch springs are operative to supplement the centrifugal weights in maintaining the clutch engaged when the vehicle is travelling above a certain critical speed, the parts of the mechanism being also so constructed and arranged and so operative that below the aforementioned critical speed the engagement of the clutch is normally effected solely by an operation of the centrifugal weights, however when the throttle is operated to substantially increase the gaseous pressure of the intake manifold then, after the lapse of a certain period of time, the clutch springs come into operation to supplement the clutch engaging operation of the centrifugal weights.

Yet another object of my invention is to provide power means for operating the clutch springs of a combined spring and centrifugally operated friction clutch, said mechanism operating to prevent an undesired slipping of the clutch and also to operate to effect a smooth engagement of the clutch under all conditions of service.

In general therefore it is an object of my invention to provide an automatically operable friction clutch operative to accurately simulate a skillful manual operation of said clutch to the end that the vehicle may be effectively accelerated under all conditions of service.

Other objects of the invention and desirable details of construction and combinations of parts will be apparent from the following description of a preferred embodiment of the invention, taken in conjunction with the accompanying drawings, in which.

Figure 1:
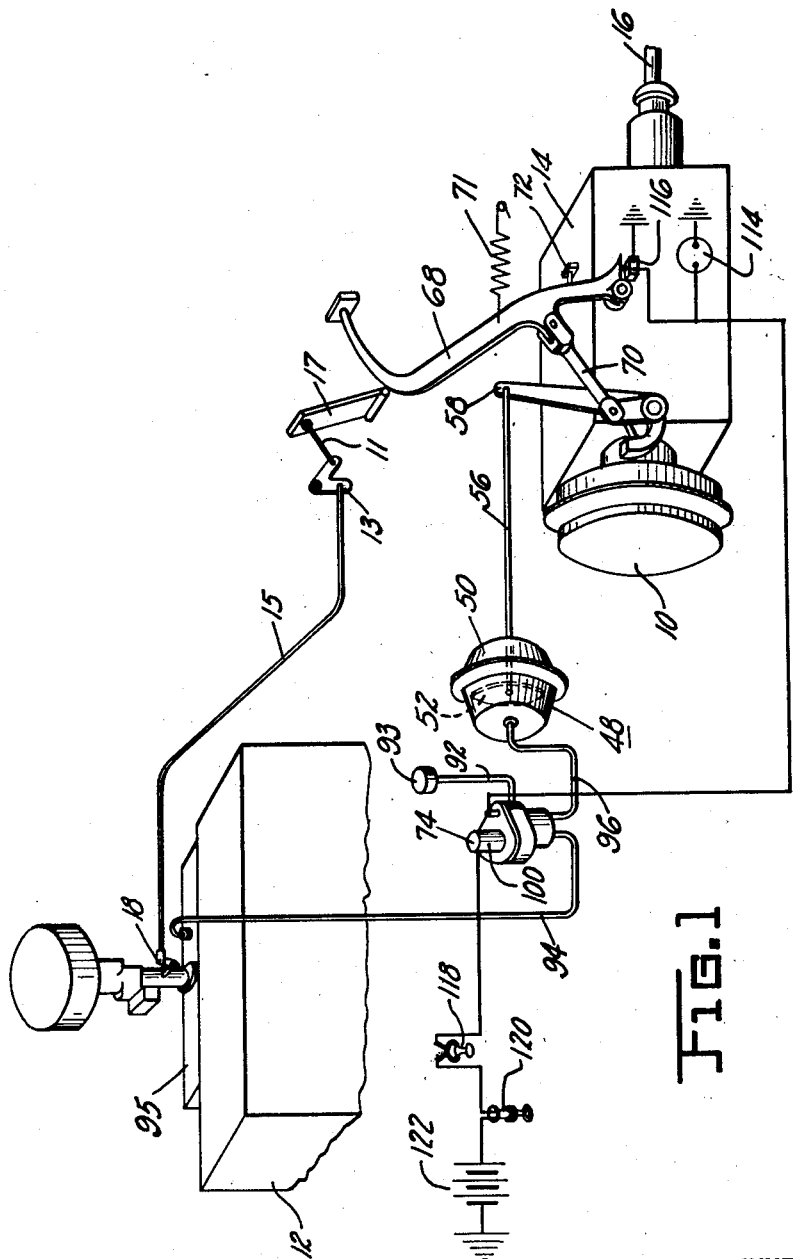
Figure 1 is a diagrammatic view of the clutch operating mechanism constituting my invention.

In that embodiment of the invention selected for illustration there is diagrammatically disclosed in Figure 1 a clutch mechanism 10 which is adapted to interconnect the internal combustion engine 12 of an automotive vehicle with a conventional change speed transmission 14, the latter being drivably connected by a propeller shaft 16 with the driving wheels of the vehicle. The accelerator 17 of the vehicle is connected to a throttle operating crank 18 by means of a link 11, a lever 13 and a link 15.

Figure 3:
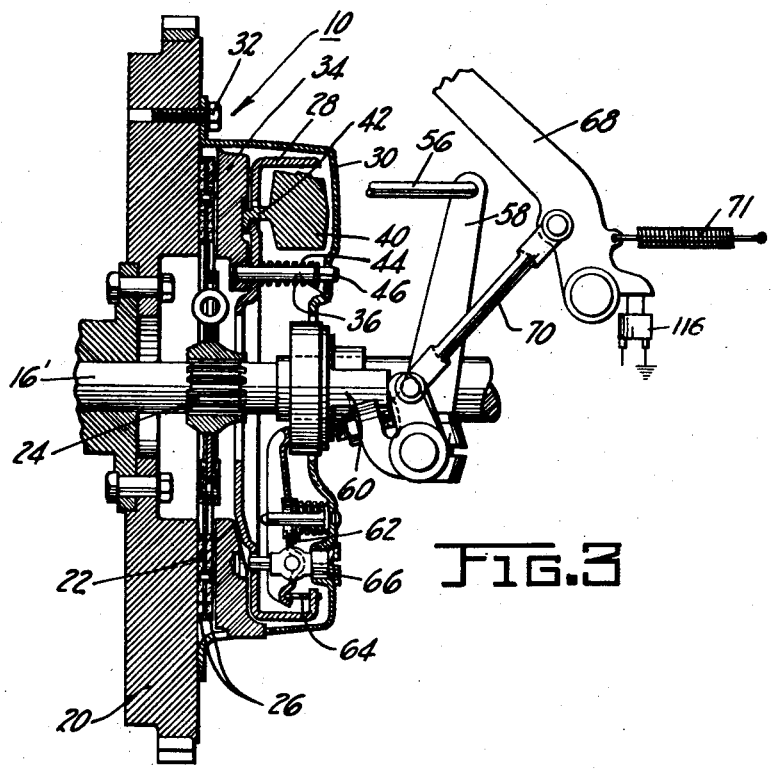
Figure 3 is a sectional view disclosing in detail the structure of the combined centrifugal and spring operated clutch to be controlled.
Figure 4:
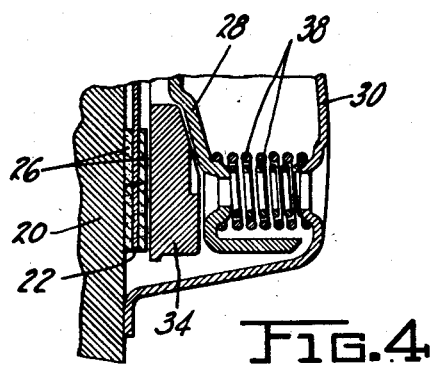
Figure 4 is an enlarged fragmentary and sectional view of a portion of the clutch structure of Figure 3 disclosing the clutch engaging springs.

My invention is directed to power means for controlling the operation of the clutch 10, the latter being of a combined centrifugal and spring operated type. As disclosed in Figure 3, a flywheel 20, drivably connected with the engine 12, constitutes the driving element of the clutch; and a disc 22, slidably keyed to a transmission operating drive shaft 16' at 24 and provided with friction rings 26, constitutes the driven clutch element. The means for forcing the driven clutch element into driving engagement with the driving clutch element comprises a pressure plate 28, mounted within a clutch housing 30 secured to the flywheel plate by fastenings 32. A ring 34 mounted on the plate 28 by a plurality of pins 36, constitutes, together with the pressure plate, a pressure applying unit, said unit being normally urged to the left, to engage the clutch, by means of a plurality of angularly spaced clutch springs 38, Figure 4.

A plurality of angularly spaced centrifugally operated weight members 40 each having a lever-like shank portion 42 extending through the plate 28 into engagement with the ring 34, are supplemented by the clutch engaging action of the springs 38 at or above a predetermined R. P. M. of the flywheel 22, the centrifugal force developed by the rotating weights serving to urge the weights outwardly and tending to force the ring from the plate and into engagement with one of the friction rings 26. Above the predetermined R. P. M. of the flywheel the clutch engaging operation of the weights 40 serves to supplement the operation of the clutch engaging springs 38. Springs 44 sleeved over the pins 36 between the plate 28 and stops 46, serve as return springs to keep the plate and ring together when the flywheel is static or below the aforementioned critical angular speed. The loading of the clutch is thus the additive result of the effects of the clutch springs 38 having a constant maximum effect and the centrifugally operated weights 40, the effect of the latter being a variable the value of which is a function of the R. P. M. of the flywheel.

The invention is specifically directed to power operated means for controlling both the clutch disengaging and engaging operations of the aforementioned clutch springs, and in such fashion as to result in their most effective operation under various operating conditions of service of the vehicle.

To the above end there is provided a fluid pressure operated motor, preferably a single ended manifold vacuum motor 48, comprising a cylinder 50 which may be secured to the chassis of the vehicle and a reciprocable piston 52 that is power element, the latter being operably connected to the pressure plate 28 of the clutch mechanism 10 by a rod 56, crank 58, slidable collar 60, lever members 62 and pins 64. The lever members 62 are fulcrumed intermediate their ends upon pins 66 secured to the housing member 30. The pressure plate 28 may also be operated to disengage the clutch by means of a conventional clutch pedal 68 connected with the sleeve 60 by a link 70. A spring 71 serves to maintain the pedal 68 in its off position against a stop 72.

Figure 2:
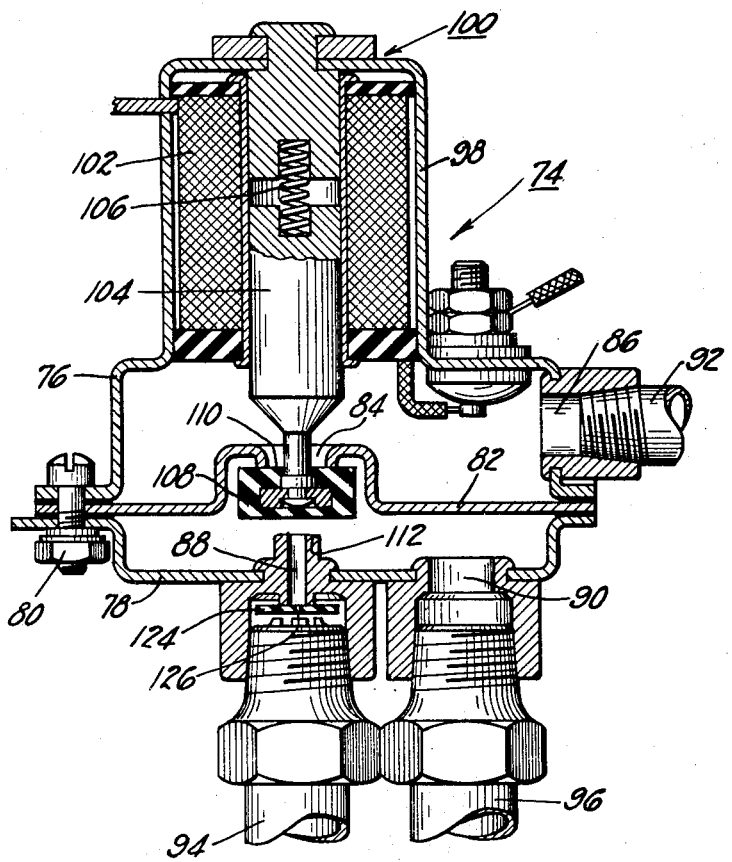
Figure 2 is a sectional view disclosing details of the valve for controlling the operation of the clutch spring operating motor of Figure 1.

One of the most important features of my invention lies in a control valve unit 74 for controlling the operation of the aforementioned clutch operating motor 48. This valve, which is disclosed in detail in Figure 2, includes two casing parts 76 and 78 having secured between them, by fastenings 80, a partition 82 said partition being provided with an opening 84. Ports 86, 88 and 90 in the valve casing are connected respectively to a conduit 92 leading to the atmosphere via an air cleaner 93, a conduit 94 connected to the intake manifold 95 of the internal combustion engine 12 and a conduit 96 connected to the control compartment of the aforementioned single ended vacuum motor 48. The casing 98 of a solenoid 100 constitutes a part of the casing member 76 said solenoid comprising a winding 102 and an armature 104 biased downwardly by a spring 106. To the lower end of the armature there is secured a valve member 108 adapted, when the solenoid is energized, to seat at 110 to open the valve, that is connect the intake manifold with the motor 48. When the solenoid is deenergized the spring 106 serves to seat the valve member at 112 to close the aforementioned port 88 and vent the motor 48 to the atmosphere; and this operation serves to initiate a clutch engaging operation of the motor that is permit the clutch springs 38 to expand to load the pressure plate 28, Figure 3.

The solenoid 74 is preferably controlled by a grounded vehicle speed responsive governor operated breaker switch 114 and a grounded clutch pedal operated breaker switch 116, said switches being electrically connected in parallel and each of said switches being electrically connected in series with the solenoid 74, a cut out switch 118, an ignition switch 120 and a grounded battery 122. The breaker switches 114 and 116 are of conventional design; accordingly, the same are not disclosed in detail.

Describing now the complete operation of the clutch and clutch control mechanism constituting my invention it will be assumed that the engine 12 is idling to make of the intake manifold a source of vacuum and that the car is at a standstill. Under these conditions the governor operated switch 114 will be closed thereby effecting an energization of the solenoid 74 to open the valve 108; and with this operation the motor 48 will be vacuum energized to compress the clutch springs 38 to move the ring 34 just out of contact with the adjacent friction ring 26.

The clutch is then disengaged for the mechanism is so constructed that the centrifugal weights 40 are at the time inoperable to effect any clutch driving contact between the driving element 20 and the driven element 22.

The driver will then probably operate the change speed transmission 14 to establish the same in say its low gear setting whereupon he will then depress the accelerator 17 to speed up the engine to effect a clutch engaging operation of the centrifugal weights 40. In this operation the clutch plate loading, that is the load of the clutch driven element 22 upon the clutch driving element 20, will of course vary in accordance with the speed of the engine driven pressure plate 28 or in other words in proportion to the engine torque.

Now it is desirable to so load the clutch plates 20 and 22 that the same will not slip unnecessarily, and this end is accomplished by means of the power operated clutch springs 38 of my invention. For when the vehicle speed reaches a certain factor, say 15 M. P. H. then a governor, not shown, functions to open the switch 114 thereby deenergizing the solenoid 74 to permit the spring 106 to move the armature 104 downwardly to close the valve 108, that is vent the motor 48 to the atmosphere; and when said motor is vented to the atmosphere then the clutch springs 38 become operative to force the driven clutch plate 22 into driving engagement with the driving clutch plate 20. This loading of the clutch plates by the operation of the clutch springs is additive of the then existing loading effected by the operation of the centrifugal weights 40. It is apparent therefore that with the mechanism of my invention the clutch plates will be well loaded when the vehicle is travelling above governor speed; and the driver may then, without fear of slipping the clutch, release the accelerator.

Another important feature of my invention lies in the operation of a check valve 124 which may be incorporated in the vacuum line interconnecting the intake manifold and the valve 108. As is disclosed in Figure 2, this valve 124 is adapted to seat at the base of the port 88. Now as is made evident by the above description, with a normal operation of the car the clutch will be disengaged as long as the car is travelling at or below governor speed and the engine is idling to reduce to a minimum the effect of the centrifugal weights 40. The solenoid 74 is then energized to open the valve 108 thereby connecting the clutch 48 with the intake manifold; and this results in an energization of said motor to effect a compression of the clutch springs 38 to render them temporarily inoperative as a means for loading the clutch plates. Now at this time if the driver of the car suddenly opens the throttle wide then the gaseous pressure within the intake manifold is appreciably increased; and if the check valve 124 were omitted this operation would result in an undesired rough and grabbing clutch engaging operation of the motor 48. With the inclusion of the check valve however, this wide open throttle operation automatically results in a closing of said valve thereby preventing this undesirable operation. The check valve is shown in its closed position in Figure 2 said position resulting from the differential of pressures to which the valve is subjected when the throttle is suddenly opened said opening resulting in an appreciable increase of gaseous pressure in the intake manifold. It follows therefore that even when the driver suddenly opens the throttle the clutch is at this time engaged solely by the operation of the weights 40 the clutch plate loading varying as the square of the speed of the flywheel.

Now to insure a delayed clutch engaging operation of the motor 48 with the above described sudden opening of the throttle the check valve is provided with a bleed orifice 126 whereby there is effected a manifold pressure controlled clutch engaging operation of said motor; and this clutch engaging operation will of course be subsequent to the operation of the centrifugal engagement of the clutch. The check valve 124 with its clutch engaging bleed orifice 126 thus provides a means for preventing any undesirable slipping of the clutch; for by virtue of said valve the clutch springs, after a relatively short lapse of time, will come into play to supplement the then operating centrifugal weights.

There is thus provided a simple and compact accelerator, clutch pedal and governor controlled power means for operating a centrifugal and spring operated friction clutch mechanism the operation thereof being controlled by (1) an operation of the accelerator to control the operation of the centrifugal weights of the mechanism, and (2) an operation of a pressure differential operated motor which controls the operation of the clutch springs of said mechanism said springs serving to supplement the clutch engaging operation of the centrifugal weights when the throttle is suddenly opened to effect a quick start of the vehicle. Above a certain vehicle speed the clutch plates are firmly pressed into engagement by the operation of both the centrifugal weights and the clutch springs to prevent the slipping of said plates one with respect to the other.

With the mechanism of my invention the clutch springs may be rendered inoperative either by depressing the clutch pedal to close the switch 116 or by reducing the speed of the vehicle to or below the aforementioned critical speed to thereby close the switch and to effect this operation of the clutch springs by the motor 48 it is, of course, necessary that the intake manifold pressure be such as to make possible an energization of said motor. The depression of the clutch pedal, in addition to closing the switch 116 to effect the power operation of the clutch, effects a manual operation of the clutch the two operations being concurrent or substantially so. As to the engagement of the clutch below governor speed said engagement is, with a normal operation of the throttle, effected solely by an operation of the centrifugal weights 40, however, when the throttle is at this time suddenly opened then after a certain lapse of time the clutch springs come into play to supplement the clutch engaging operation of the centrifugal weights and prevent any unnecessary slipping of the clutch.

While one illustrative embodiment has been described, it is not my intention to limit the scope of the invention to that particular embodiment, or otherwise than by the terms of the appended claims.

I claim:

1. In an automotive vehicle provided with a vehicle speed responsive governor, a clutch pedal and a friction clutch comprising a driving plate and a driven plate; centrifugally operated means for forcing said plates into contact with each other, and clutch springs also operable to force said plates into contact with each other to thereby supplement the clutch engaging operation of the centrifugally operated means; power means for controlling the operation of the clutch springs comprising a pressure differential operated motor, means for controlling the operation of said motor comprising a valve, and electrical means for controlling the operation of the valve comprising a switch operated by the aforementioned governor and a switch operated by the clutch pedal.

2. In an automotive vehicle provided with a vehicle speed responsive governor and a friction clutch mechanism comprising a driving plate and a driven plate, centrifugally operated means for forcing said driven plate into contact with the driving plate, and clutch springs also operable to force said driven plate into contact with the driving plate to thereby supplement the operation of the centrifugal operated means in effecting an engagement of the clutch; power means for controlling the operation of the clutch springs comprising a pressure differential operated motor, means for controlling the operation of said motor comprising a three-way valve, and means for controlling the operation of the latter valve comprising a switch operable by the aforementioned governor, when the vehicle speed is lowered to a certain factor, to effect a clutch disengaging operation of the three-way valve whereby when the vehicle speed is lowered to the aforementioned factor the clutch springs are compressed by an operation of said motor to render the same ineffective to engage the clutch.

3. In an automotive vehicle provided with a vehicle speed responsive governor and a friction clutch mechanism comprising a driving plate, a driven plate, centrifugally operated means for forcing said plates into contact with each other, and clutch springs also operable to force said plates into contact with each other to thereby supplement the operation of the centrifugally operated means; power means for controlling the operation of the clutch springs comprising a pressure differential operated motor, means for controlling the operation of said motor comprising a three-way valve, means for actuating said valve comprising a solenoid and a spring and electrical means for controlling the operation of said solenoid comprising a switch operated by the aforementioned governor, the parts of the aforementioned mechanism being so constructed and arranged and so operative that when the vehicle speed is lowered to a certain factor there results a clutch disengaging operation of the aforementioned motor followed by a clutch engaging operation of said motor when the vehicle speed is increased above said certain factor.

4. In an automotive vehicle provided with an internal combustion engine having an intake manifold, and further provided with a friction clutch mechanism comprising a driving plate, a driven plate, a pressure plate, centrifugally operated means for forcing said driven plate into contact with the driving plate, and clutch springs also operable to force said pressure plate into contact with the driven plate to thereby supplement the operation of the centrifugally operated means; power means for controlling the operation of the clutch springs comprising a pressure differential operated motor, a valve for controlling the operation of said motor, air transmitting means interconnecting said valve and motor, air transmitting means interconnecting said valve and intake manifold, a check valve incorporated in the latter air transmitting means said check valve being provided with an air bleed opening therein to make possible, when the check valve is closed, a relatively slow flow of air from the intake manifold to the motor when the gaseous pressure within said manifold is appreciably increased as the clutch is being engaged; and means for controlling the operation of the three-way valve including a switch operated by the aforementioned governor.

5. In an automotive vehicle provided with a clutch pedal, an internal combustion engine having an intake manifold, a vehicle speed responsive governor and a friction clutch mechanism comprising a driving plate, a driven plate, a pressure plate, centrifugally operated means for forcing said driven plate into contact with the driving plate, and clutch springs also operable to force said driven plate into contact with the driving plate to thereby supplement the operation of the centrifugally operated means; power means for controlling the operation of the clutch springs comprising a pressure differential operated motor operably connected with said springs, valve means for controlling the operation of said motor including a three-way valve, air transmitting means interconnecting said valve and manifold, a check valve having a bleed opening therein incorporated in the latter air transmitting means, air transmitting means interconnecting the three-way valve and motor and means for operating and controlling the operation of the latter valve including a switch operated by the aforementioned governor and a switch operated by the clutch pedal; the parts of the aforementioned mechanism being so constructed and arranged and so operative that the three-way valve is opened, to effect a clutch spring disengaging operation of the motor, when either the clutch pedal is depressed to close the switch operated thereby or when the vehicle is slowed down to a certain speed to effect a closing of the governor operated switch, and further operable to effect a clutch spring engaging operation of the motor when the speed of the vehicle is increased above the aforementioned certain speed; the parts of the mechanism being also so constructed and arranged and so operative that there is effected, during the engagement of the clutch and by virtue of the operation of the aforementioned check valve, a relatively slow clutch engaging operation of said motor when the gaseous pressure within the intake manifold exceeds the gaseous pressure within the motor.

6. In an automotive vehicle including an internal combustion engine having an intake manifold, an accelerator operated throttle valve operative in part to control the operation of the engine and in part controlling the gaseous pressure in said manifold, a combined centrifugal and spring operated friction clutch including driving and driven plates adapted to be forced into contact with each other and means for effecting said driving contact comprising centrifugally operated means and spring means; power means for operating and controlling the operation of the spring means to thereby in part control the operation of the clutch, said power means including a pressure differential operated motor, air transmitting means interconnecting the intake manifold and motor, valve means for controlling the operation of said motor by controlling the passage of air into and from the motor via said air transmitting means, said valve means including a bleed valve and a three-way valve, means for controlling the operation of said three-way valve including a vehicle speed responsive governor and a switch operated by said governor; the parts of the aforementioned mechanism being so constructed and arranged and so operative that the motor is energized to effect a clutch disengaging operation of the spring means, when the speed of the vehicle is reduced to a certain factor resulting in an operation of the aforementioned governor operated switch; the parts of the mechanism being also so constructed and arranged and so operative that the bleed valve is operative, to control the clutch engaging operation of the motor and thereby control the clutch engaging operation of the spring means, when the throttle valve is sufficiently opened to increase the gaseous pressure in the intake manifold to a certain factor.

EDWARD E. HUPP.

REFERENCES CITED

The following references are of record in the file of this patent:

UNITED STATES PATENTS

| Number | Name | Date |
| --- | --- | --- |
| 2,168,682 | Paine | Aug. 8, 1939 |
| 2,177,662 | Kliesrath et al. | Oct. 31, 1939 |
| 2,239,163 | Wemp | Apr. 22, 1941 |
| 2,296,290 | Mayrath | Sept. 22, 1942 |